United States Patent
Igarashi

(10) Patent No.: US 10,382,259 B2
(45) Date of Patent: Aug. 13, 2019

(54) MANAGEMENT APPARATUS, CONTROL METHOD, AND STORAGE MEDIUM

(71) Applicant: CANON KABUSHIKI KAISHA, Tokyo (JP)

(72) Inventor: Toshiaki Igarashi, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 33 days.

(21) Appl. No.: 15/693,836

(22) Filed: Sep. 1, 2017

(65) Prior Publication Data
US 2018/0069752 A1    Mar. 8, 2018

(30) Foreign Application Priority Data
Sep. 5, 2016  (JP) ................................ 2016-172764

(51) Int. Cl.
*H04L 12/24* (2006.01)
*H04L 29/06* (2006.01)
*H04L 29/08* (2006.01)

(52) U.S. Cl.
CPC ...... *H04L 41/0803* (2013.01); *H04L 41/0213* (2013.01); *H04L 41/0853* (2013.01); *H04L 41/0866* (2013.01); *H04L 41/22* (2013.01)

(58) Field of Classification Search
CPC ............. H04L 41/0803; H04L 41/0213; H04L 41/0853
USPC .......................... 709/217, 218, 220, 221, 229
See application file for complete search history.

(56) References Cited

U.S. PATENT DOCUMENTS

| | | | | |
|---|---|---|---|---|
| 8,190,719 B2* | 5/2012 | Furukawa | ........... | H04L 41/0869 370/352 |
| 8,930,516 B2 | 1/2015 | Igarashi | | |
| 2006/0129669 A1* | 6/2006 | Kojima | ................. | H04L 41/082 709/223 |
| 2010/0287270 A1* | 11/2010 | Hashimoto | ......... | H04L 12/6418 709/223 |
| 2014/0365621 A1* | 12/2014 | Vieira | ..................... | H04L 12/18 709/220 |
| 2015/0067173 A1 | 3/2015 | Igarashi | | |

FOREIGN PATENT DOCUMENTS

WO    2009/063555 A1    5/2009

OTHER PUBLICATIONS

"Network Configuration Management with NETCONF and Yang" Jurgen Schinwalder, IETF.org, Jul. 29, 2012 https://www.ietf.org/slides/slides-edu-netconf-yang-00.pdf (Year: 2012).*

* cited by examiner

*Primary Examiner* — Randy A Scott
(74) *Attorney, Agent, or Firm* — Carter, DeLuca & Farrell LLP

(57) ABSTRACT

If a setting that a second protocol different from a first protocol which is SNMP is used preferentially to the first protocol is selected and a sending target device supports the second protocol, a management apparatus sends setting information according to specifications of the second protocol to the device. If the setting in which the second protocol is used preferentially to the first protocol is selected and a sending target device does not support the second protocol, the management apparatus sends setting information according to specifications of the first protocol to the device.

10 Claims, 16 Drawing Sheets

| Attribute name — 501 | Value — 502 |
|---|---|
| Supported protocol | NETCONF, SNMP |
| Protocol to be used | NETCONF, SNMP |
| Preferential protocol | NETCONF |
| Resend by other protocols | ON |

| SN — 511 | IP address — 512 | Device name — 513 | Product name — 514 | Installation location — 515 | Supported protocol — 516 |
|---|---|---|---|---|---|
| ABC123 | 10.1.1.10 | Device A | Multi-function device A | OfficeA | SNMP, NETCONF |
| ABC456 | 10.1.1.20 | Device B | Multi-function device B | OfficeB | SNMP, NETCONF |
| ABC789 | 10.1.1.30 | Device C | Multi-function device C | OfficeC | SNMP |

FIG. 5C

| Setting information ID | Device name | Sleep transition time |
|---|---|---|
| S001 | AAA | 5 minutes |
| S002 | BBB | 10 minutes |
| S003 | CCC | |

| Setting information ID | SN | IP address | Installation location |
|---|---|---|---|
| S001 | ABC123 | 20.1.1.10 | OfficeE |
| S001 | ABC456 | 20.1.1.20 | OfficeF |
| S001 | ABC789 | 20.1.1.30 | OfficeG |

| Sending ID | Sending date and time | SN | Result | Protocol used |
|---|---|---|---|---|
| 1 | 2016/xx/yy | AAA123 | Successful | SNMP |
| 1 | 2016/xx/yy | AAA456 | Successful | NETCONF |
| 1 | 2016/xx/yy | AAA789 | Successful | SNMP |

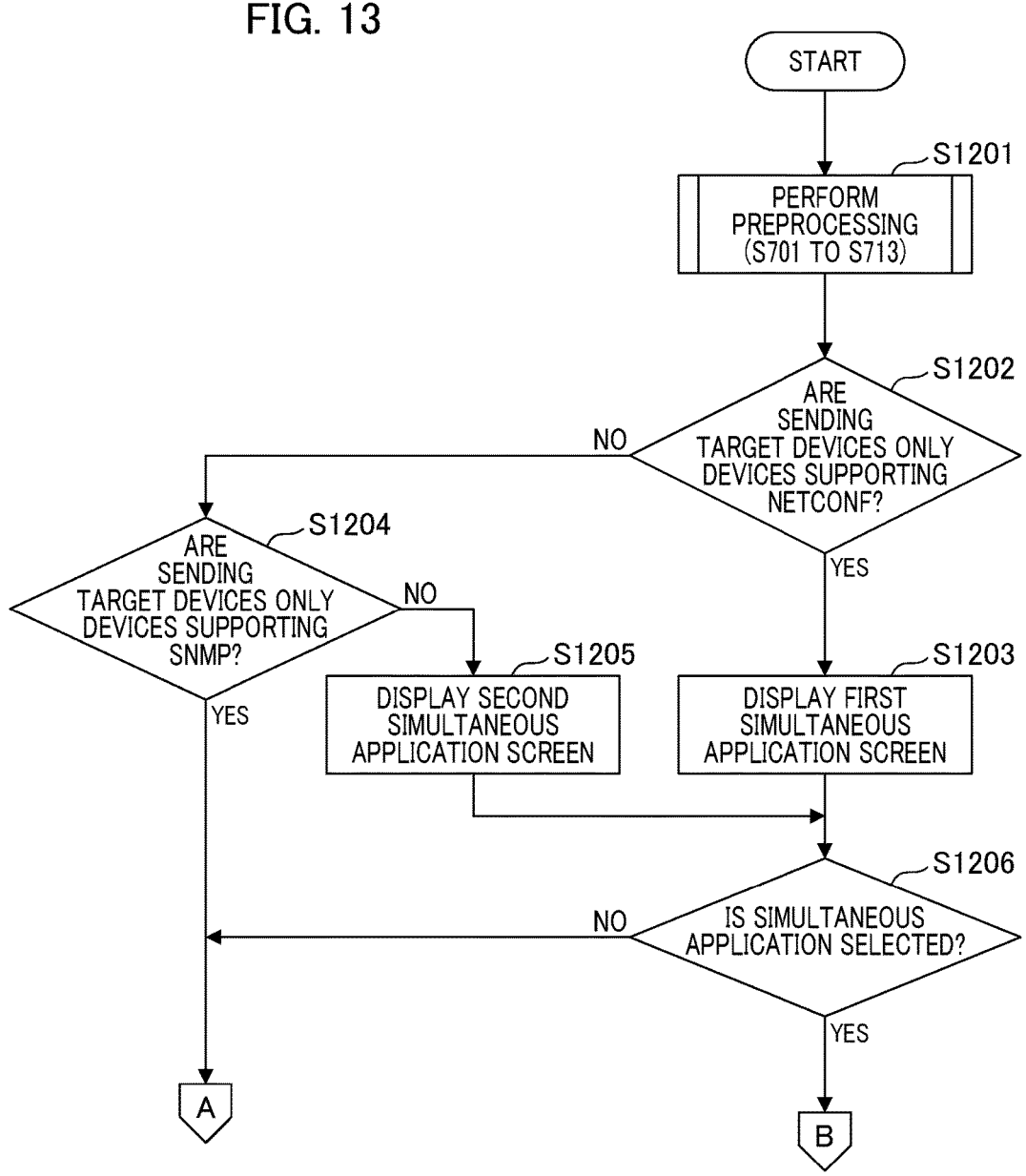

MANAGEMENT APPARATUS, CONTROL METHOD, AND STORAGE MEDIUM

BACKGROUND OF THE INVENTION

Field of the Invention

The present invention relates to a management apparatus, a control method, and a storage medium.

Description of the Related Art

Conventionally, the Simple Network Management Protocol (SNMP) is used as a protocol used for changing setting information of devices represented by network devices and multi-function devices. A combination of one or more setting items and setting values will be referred to as "setting information" below.

In recent years, the Internet Engineering Task Force (IETF) has developed and published the Network Configuration Protocol (NETCONF) as a more convenient protocol. The NETCONF includes a mechanism of verification of setting information and a concept of transaction which are not provided in the SNMP.

PCT International Publication No. WO 2009/063555 discloses a control proxy device in which, when control requests are received from a plurality of management apparatuses having different communication formats (protocols), control information indicating control content included in the control request is converted, and the converted control information is used for a control target device.

Most current devices supporting the NETCONF are SNMP supporting devices which additionally support the NETCONF. In addition, due to problems such as cost, only a part of setting information that can be set with the SNMP can be set with the NETCONF in some cases. However, in the control proxy device disclosed in PCT International Publication No. WO2009/063555, support of a plurality of protocols by the management apparatus and the devices is not considered. Therefore, it is not possible to send setting information flexibly and reliably according to a support status of a protocol in network devices in some cases.

SUMMARY OF THE INVENTION

The present invention provides a management apparatus capable of sending setting information flexibly and reliably according to a support status of protocols in network devices in an environment in which network devices supporting a plurality of protocols are mixed.

A management apparatus according to an embodiment of the present invention includes: a memory storing instructions related to operations for management of a plurality of network devices using a first protocol that is SNMP (Simple Network Management Protocol) and a second protocol different from the first protocol; and a processor which is capable of executing the instructions causing the management apparatus to: manage support or nonsupport of the second protocol and the first protocol for the network devices; perform setting in which the second protocol is used preferentially to the first protocol when sending setting information to a network device; send, according to the setting by which the second protocol is used preferentially to the first protocol, the setting information according to specifications of the second protocol to the network device if the sending target network device supports the second protocol; and send the setting information according to specifications of the first protocol to the network device if the sending target network device does not support the second protocol, wherein the second protocol defines a request for controlling a setting operation using a plurality of data stores secured in the network device, in which setting information is managed in a data format different from that of the first protocol.

Further features of the present invention will become apparent from the following description of exemplary embodiments (with reference to the attached drawings).

BRIEF DESCRIPTION OF THE DRAWINGS

FIG. 5A to FIG. 5E are diagrams showing examples of tables managed by the management apparatus.

FIG. 13 is a flowchart showing the process performed when the management apparatus sends setting information.

DESCRIPTION OF THE EMBODIMENTS

Embodiments for performing the present invention will be described below with reference to the drawings.

(First Embodiment)

Figure 1:
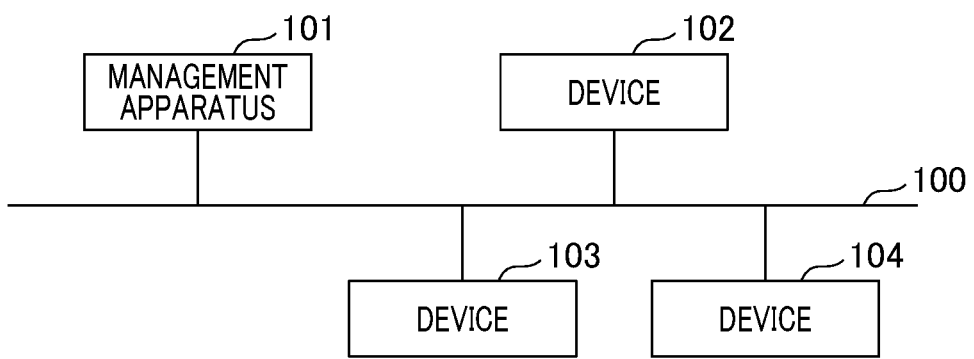
FIG. 1 is a diagram showing an example of a system configuration in a first embodiment.

FIG. 1 is a diagram showing an example of a system configuration in the first embodiment.

The system in the first embodiment includes a management apparatus 101 and a plurality of network devices (devices) 102 to 104. The device is a device, for example, a multi-function device or printer, a scanner, a network relay device (router), a network camera, or the like. The management apparatus 101 and the devices 102 to 104 are connected to a network. Here, a local area network (LAN) 100 is exemplified as a network. Note that a system including one management apparatus and three devices will be exemplified in the first embodiment, but the number of management apparatuses and devices is not limited thereto.

Figure 2:
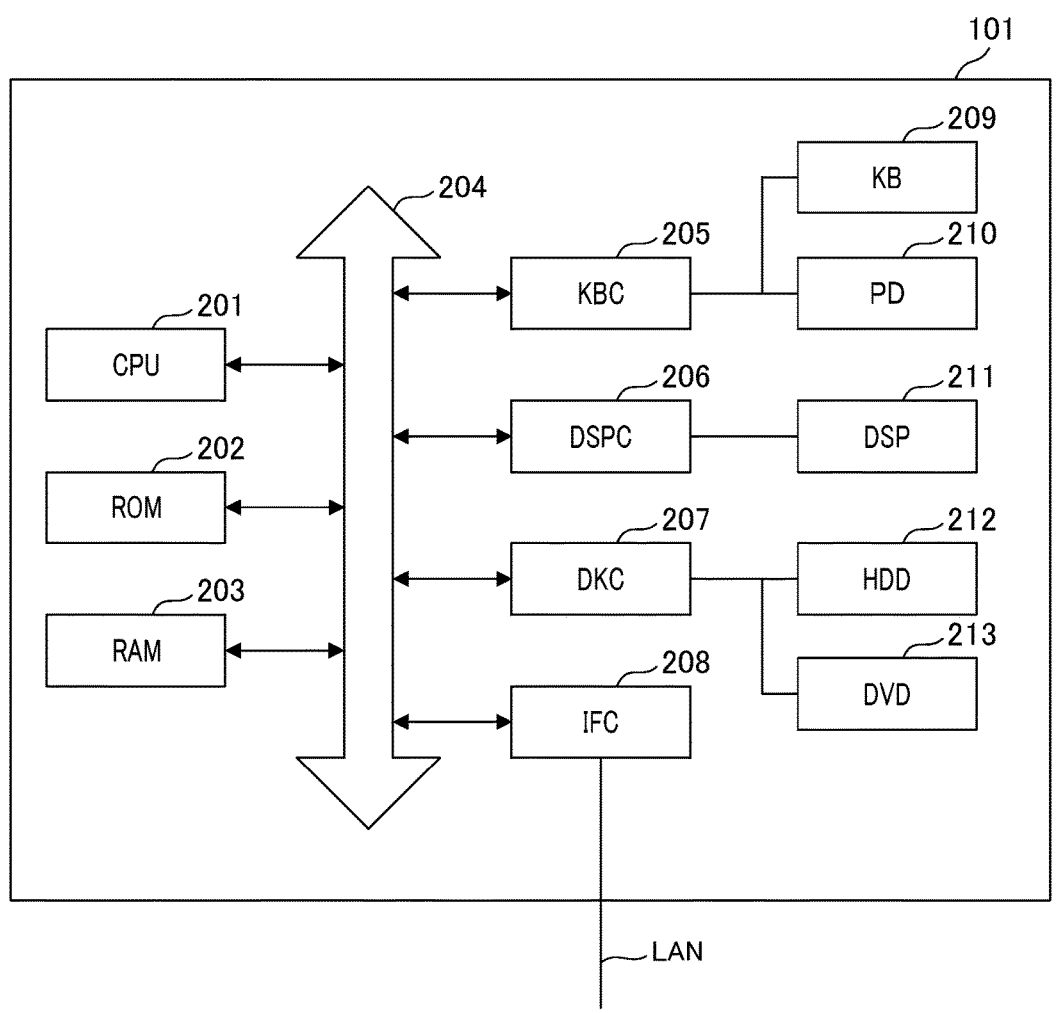
FIG. 2 is a block diagram showing a hardware configuration example of a management apparatus.

FIG. 2 is a block diagram showing a hardware configuration example of the management apparatus 101.

The management apparatus 101 includes a CPU 201 that executes a management program stored in a ROM 202 or a hard disk (HDD) 212. In addition, the CPU 201 collectively controls components connected to a system bus 204. A BIOS and a boot program are stored in the ROM 202.

A RAM 203 functions as a main memory, a work area, and the like of the CPU 201. A keyboard controller (KBC) 205 controls input of instructions from a keyboard (KB) 209, a pointing device (PD) 210, and the like. A display controller (DSPC) 206 controls display on a display (DSP) 211. A disk controller (DKC) 207 controls access to the hard disk (HDD) 212, a DVD-ROM drive (DVD) 213, and the like.

A boot program, an operating system, a database, a management program, data, and the like are stored in the hard disk (HDD) 212, a DVD-ROM (DVD), and the like. An interface controller (IFC) sends and receives information to and from other devices via the LAN 100. Above-described components of the management apparatus 101 are arranged on the system bus 204.

Here, unless otherwise specified throughout the following descriptions, the CPU 201 is a main component for execution of hardware related to the management apparatus 101. The CPU 201 reads and executes a management program stored in the hard disk (HDD) 212 to realize the present invention. The management program is a main component for controlling the process in the first embodiment to be described below in a software manner. In addition, the management program may be supplied in a form in which the program is stored in a storage medium such as a DVD-ROM. In this case, the program is read from the storage medium using the DVD-ROM drive (DVD) 213 or the like, and installed in the hard disk (HDD) 212.

Figure 3:
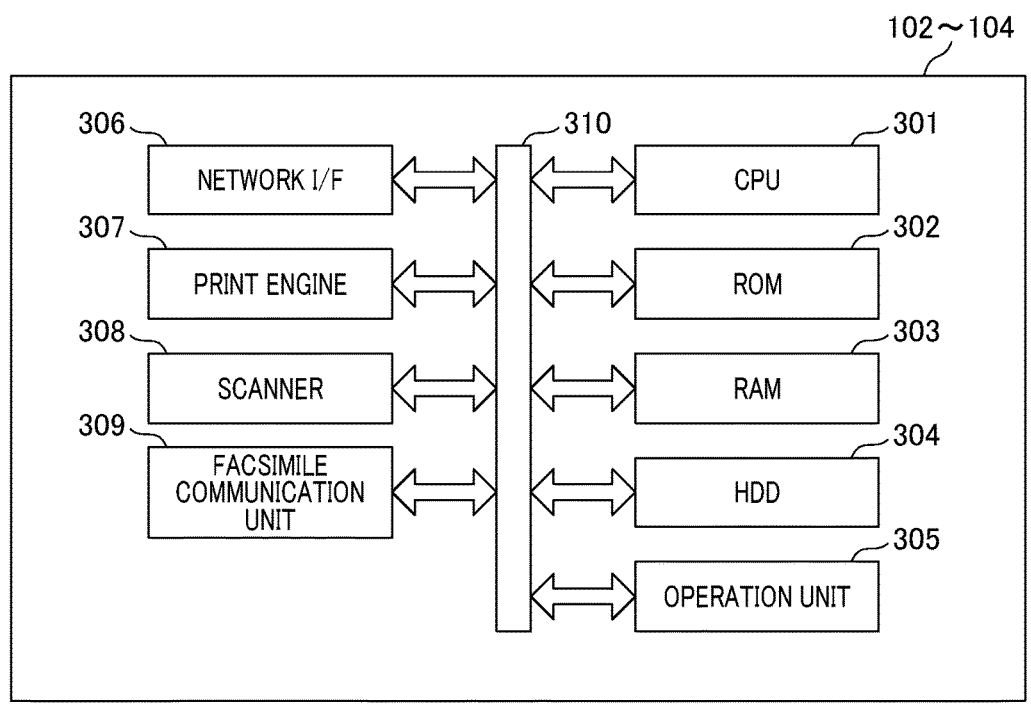
FIG. 3 is a block diagram showing a hardware configuration example of a device.

FIG. 3 is a block diagram showing a hardware configuration example of the device 102.

Here, a hardware configuration in which the device 102 is, for example, a multi-function device, will be described. Note that the devices 103 and 104 are assumed to have the same configuration. A CPU 301 controls the entire device 102, and collectively controls components connected to a system bus 310. A serial number and the like are stored in a ROM 302. A RAM 303 is used for a work area of the CPU 301, a reception buffer, and image rendering.

Firmware, an extended program, font data, and the like are stored in a hard disk (HDD) 304. An operation unit 305 includes various switches and buttons and a liquid crystal display unit for displaying messages. A network I/F 306 is a network interface for connection to a network through which information is sent and received to and from other devices via the LAN 100. A print engine 307 performs printing on recording paper. A scanner 308 reads a document. A facsimile communication unit 309 performs sending and reception by facsimile. The above-described components of the device 102 are arranged on the system bus 310.

Figure 4:
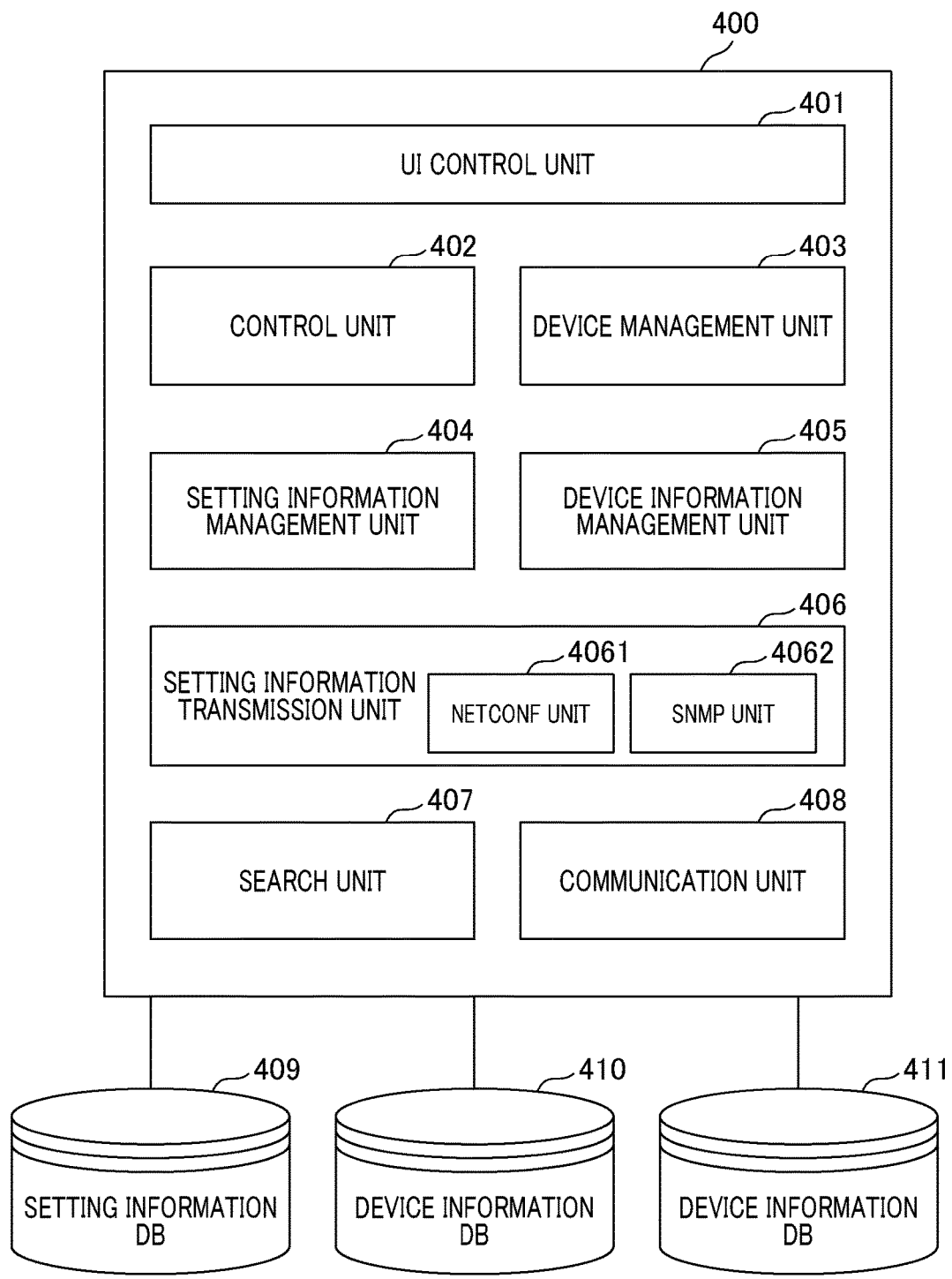
FIG. 4 is a diagram showing an example of a functional configuration of a management program.

FIG. 4 is a diagram showing an example of a functional configuration of a management program 400 that is executed in the management apparatus 101.

Each function shown in FIG. 4 is implemented by the CPU 201 executing the management program 400. An UI control unit 401 provides a graphical user interface (GUI) for a user to operate the management program 400. The GUI includes a Web page that uses HyperText Transfer Protocol (HTTP) and can be displayed on another PC. In addition, the GUI maybe displayed on the display 211 included in the management apparatus 101.

A control unit 402 instructs functions of the management program 400 which perform various types of processing to be described below according to an instruction of the UI control unit 401 and a request received by a communication unit 408. A device management unit 403 searches for a device connected to the LAN 100 using a search unit 407. The search for a device can be implemented by transmitting a search request packet using a Service Location Protocol (SLP), an SNMP, or the like.

The device management unit 403 can additionally obtain detailed information (such as a model name, a serial number, a capacity, and a state) of the device through the communication unit 408 from the device found through the search. In addition, the device management unit 403 can obtain information about a protocol that can be used when setting information is sent to the device. The device management unit 403 stores location information (an IP address) of the device and information obtained from the device in a device list 510 in a device information database (DB) 410.

A setting information management unit 404 stores setting information that is input to a setting information edit screen to be described below by the user in a setting information management table 520 (FIG. 5C) in a setting information DB 409. A device information management unit 405 determines attribute information of the management apparatus 101 and stores it in a device information table 500 (FIG. 5A) in a device information DB 411. The attribute information of the management apparatus 101 includes management apparatus specific information and attribute information input by the user. Information input to a policy screen (FIG. 6A) to be described below is also stored in the device information table 500 as attribute information of the management apparatus 101.

A setting information sending unit 406 sends setting information to a device through the communication unit 408. In addition, the setting information sending unit 406 includes a NETCONF unit 4061 configured to send setting information of a device according to specifications of NETCONF (a second protocol) and an SNMP unit 4062 configured to send setting information of a device according to specifications of SNMP (a first protocol). Note that the setting information sending unit 406 may send setting information using a protocol other than NETCONF and SNMP and may include a component that sends setting information using the protocol. That is, the first protocol and the second protocol are not limited to SNMP and NETCONF.

Here, the second protocol defines a request for controlling a setting operation using a plurality of data stores (areas) in which setting information is managed in a data format that is different from that in the first protocol secured in a device. When the second protocol is NETCONF, NETCONF includes at least one of a Candidate data store and a Startup data store in addition to a Running data store as a plurality of data items.

The Running data store is an area in which current setting data is stored and is an active data store in a device. The Candidate data store is an area in which setting data is temporarily stored and is an inactive data store in which an operation can be performed without influencing a current configuration of a device defined in NETCONF. The Startup data store is an area in which setting data applied when a device is activated is stored. The Running data store is a data store required for the specifications of NETCONF, and the Candidate and Startup data stores are optional data stores for the specifications.

The search unit 407 searches for a device connected to the LAN 100 through the communication unit 408. The communication unit 408 communicates with a device according to an instruction from the NETCONF unit 4061, the SNMP unit 4062, and the search unit 407. In addition, the communication unit 408 performs HTTP communication, and transmits a Web page received from the UI control unit 401 to another PC as necessary. The setting information DB 409, the device information DB 410, and the device information DB 411 are databases in which various tables to be described below are stored. The user can read information registered in a database through the UI control unit 401.

FIG. 5A to FIG. 5E are diagrams showing examples of tables that are managed by the management apparatus 101 in the setting information DB 409, the device information DB 410, and the device information DB 411.

Here, configurations of the tables shown in FIG. 5A to FIG. 5E are only examples, and the present invention is not limited thereto, and different configurations may be used.

FIG. 5A is an example of the device information table 500. The device information table 500 includes a column 501 and a column 502. An attribute name is stored in the column 501. The attribute name is a name of an attribute of the management apparatus 101. In the first embodiment, the management apparatus 101 has at least a "supported protocol," a "protocol to be used," a "preferential protocol," and "resend by other protocols" as attributes. Names of these attributes are stored in the device information table 500.

Note that, in the first embodiment, it is assumed that setting information is sent to a device using NETCONF or SNMP. Therefore, at least "NETCONF" and "SNMP" are stored as the value of "supported protocol." The value of the attribute indicated by the attribute name 501 is stored in the column 502.

FIG. 5B is an example of the device list 510. The device list 510 includes a column 511 to a column 516. One record (data of one row) represents information about one device. A serial number (SN) of a device is stored in the column 511. An IP address of a device is stored in the column 512. A nickname of a device is stored as a device name in the column 513.

A product name of a device is stored in the column 514. Information about a location at which a device is installed is stored in the column 515. Information about a protocol that can be used to send setting information to a device obtained by the device management unit 403 using the search unit 407 is stored in the column 516. That is, information indicating whether or not a protocol such as NETCONF and SNMP is supported is stored. Here, information about, for example, a device error state and options, may be stored in the device list 510 in addition to the information stored in the columns 511 to 516.

FIG. 5C is an example of the setting information management table 520. The setting information management table 520 includes a column 521 to a column 523. One record represents one piece of setting information. A setting information ID which is an identifier for uniquely identifying setting information of a device is stored in the column 521. A device name of a target device to which the setting information is sent is stored in the column 522.

A time taken for a device to transition to a sleep state is stored in the column 523 as setting information. Here, the "device name" and the "sleep transition time" are exemplary information items stored as setting information, but the present invention is not limited thereto, and other information items may be stored. In this case, the other information items may be stored in the setting information management table 520 by adding one or more columns.

FIG. 5D is an example of an individual information management table 530. The individual information management table 530 includes a column 531 to a column 534. One record represents one piece of individual information. The individual information is setting information that is unique to an individual device. On the other hand, the setting information stored in the setting information management table 520 is setting information common to all devices. The value of the setting information ID 521 indicating setting information stored in the setting information management table 520 related to each record of individual information is stored in the column 531.

In the example shown in FIG. 5D, the value of the first row record in the setting information ID 531 is "S001." This indicates that the first row record is related to a record (that is, the first row record in the setting information management table 520) in which the value of the setting information ID 521 of the setting information management table 520 is "S001." Similarly, the second and third row records in the individual information management table 530 are related to the first row record in the setting information management table 520.

A serial number (SN) of a device is stored in the column 532. The serial number stored in the column 532 is one of serial numbers of devices stored in the device list 510. An IP address of a device is stored in the column 533. Information about a location at which a device is installed is stored in the column 533. Here, the "IP address" and the "installation location" are exemplary information items stored as pieces of individual information, but the present invention is not limited thereto, and other information items may be stored. In this case, the other information items may be stored in the individual information management table 530 by adding one or more columns.

FIG. 5E is an example of a result table 540. The result table 540 includes a column 541 to a column 545. One record represents the result of sending setting information to one device. A sending ID is stored in the column 541. The sending ID is identification information that is uniquely provided when setting information stored in the setting information management table 520 and the individual information management table 530 is sent to a device.

In the example shown in FIG. 5E, the values of the sending IDs 541 in the first row record to the third row record are all "1". The sending of setting information corresponding to these three records is related and is a series of sending. Information about the date and time (sending date and time) at which sending is performed is stored in the column 542. A serial number of a target device to which sending is performed is stored in the column 543. The result of sending performed is stored in the column 544. A protocol used when sending is performed is stored in the column 545.

FIG. 6A, FIG. 6B, FIG. 7A and FIG. 7B are examples of UI screens that are provided by the management apparatus 101 using the UI control unit 401 of the management program 400.

Figure 6A:
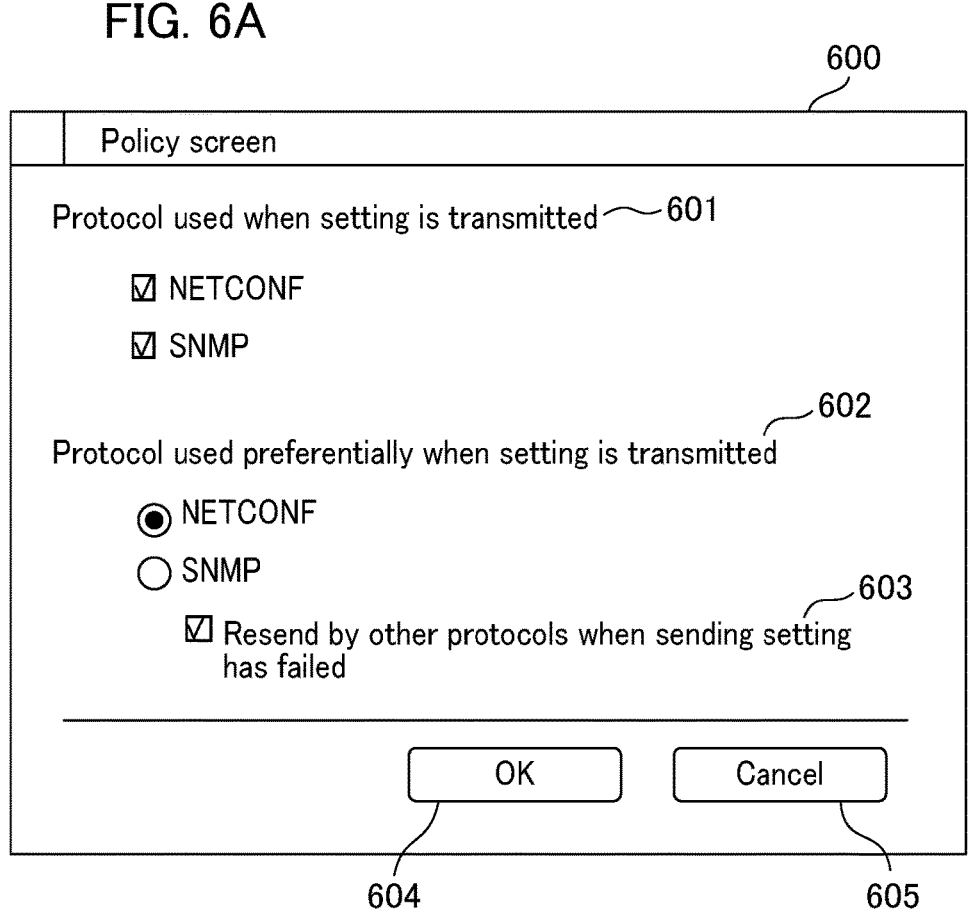
FIG. 6A and FIG. 6B are diagrams showing examples of UI screens provided by the management apparatus.

FIG. 6A shows an example of a policy screen 600. In a selection area 601, a protocol to be used when setting information is sent is selected. The value of the attribute name of "supported protocol" in the device information table 500 is displayed. Since "NETCONF" and "SNMP" are stored in the device information table 500 in FIG. 5A, "NETCONF" and "SNMP" are displayed here. The user selects at least one protocol in the selection area 601.

In a preference selection area 602, a protocol which is preferentially used when setting information is sent can be selected. The user selects any one from among the protocols selected in the selection area 601. In a resending selection area 603, when a protocol selected in the preference selection area 602 is set and sending is performed using the set protocol, if the sending has failed, it is selected whether setting information is resent using another protocol. It is possible to perform selection when a plurality of protocols are selected in the selection area 601.

When an OK button 604 is pressed, the management program 400 stores the settings selected in areas 601 to 603 in the device information table 500. Specifically, the device information management unit 405 stores a protocol selected in the selection area 601 as the value of the attribute name of "protocol to be used." In addition, the device information management unit 405 stores a protocol selected in the preference selection area 602 as the value of the attribute name of "preferential protocol." In addition, the device information management unit 405 stores "ON" or "OFF" as the value of the attribute name of "resend by other protocols" on the basis of the result selected in the resending selection area 603. Then, the policy screen 600 is terminated. When a cancel button 605 is pressed, the management program 400 discards the edit results of the policy screen 600 and terminates the policy screen 600.

Figure 6B:
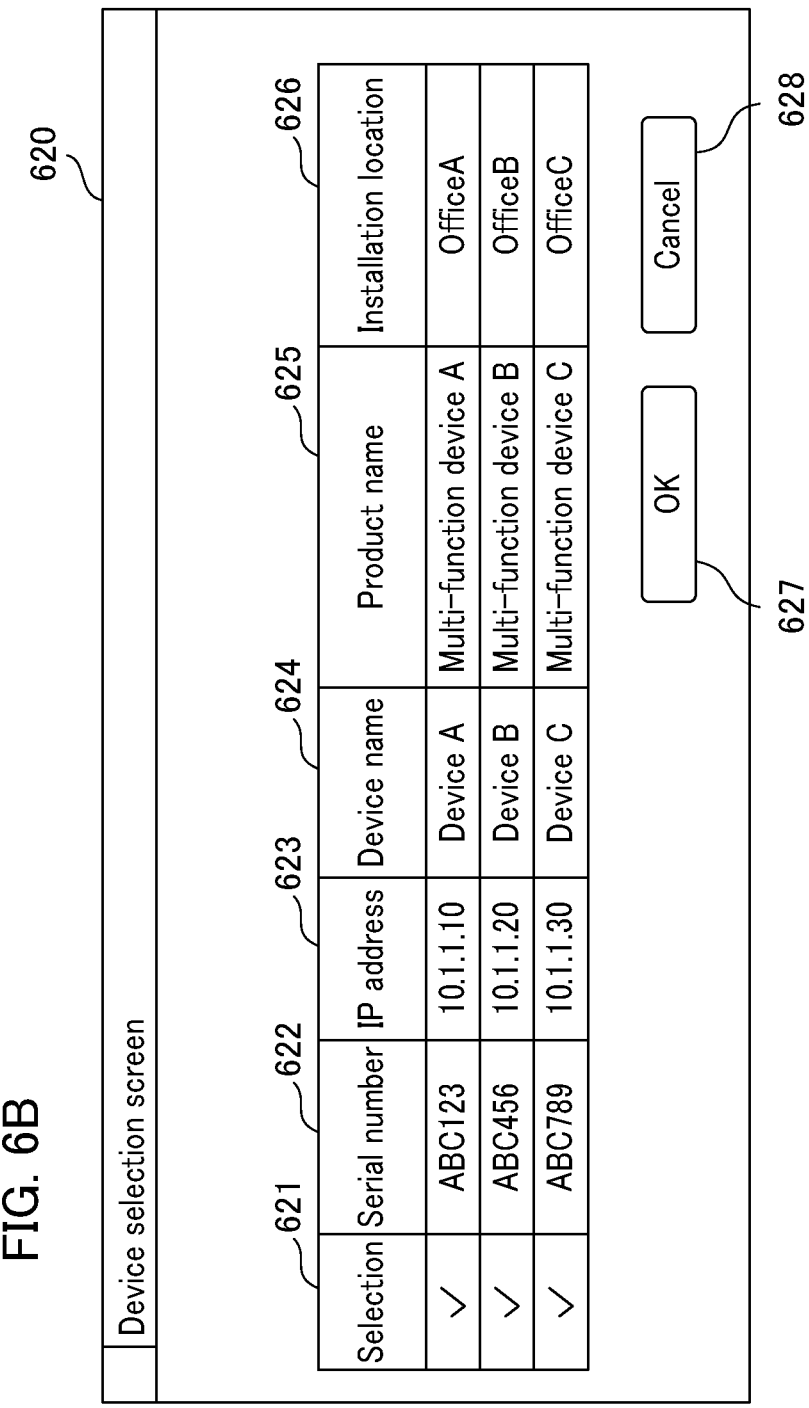

FIG. 6B shows an example of a device selection screen 620. In a checkbox 621, the user selects a device that is a sending target of setting information. In a serial number 622, the value of the column 511 of the device list 510 is displayed. Similarly, the values of the columns 512 to 515 of the device list 510 are displayed in columns 623 to 626.

When an OK button 627 is pressed, the management program 400 temporarily stores the serial number of the device selected in the checkbox 621 in the RAM 203 or the HDD 212. When a cancel button 628 is pressed, the management program 400 discards the edit results of the device selection screen 620 and terminates the device selection screen 620.

Figure 7A:
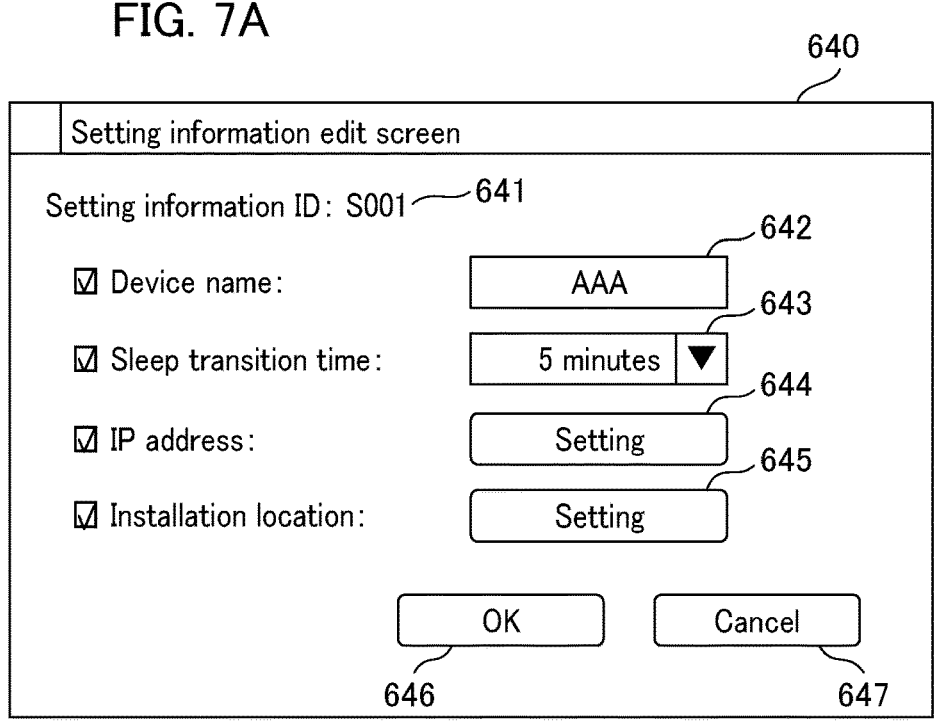
FIG. 7A and FIG. 7B are diagrams showing examples of UI screens provided by the management apparatus.

FIG. 7A shows an example of a setting information edit screen 640. In a setting information ID 641, an identifier of setting information which is being edited is displayed. When the setting information edit screen 640 is generated, the UI control unit 401 generates an identifier for uniquely identifying setting information within the management program 400. Here, while the UI control unit 401 generates the setting information ID 641 in the first embodiment, the user may select the setting information ID 641. In this case, it is necessary for the user to select a value that is not included in the management program 400 as a value of the setting information ID.

The setting information edit screen 640 includes a device name input area 642, a sleep transition time input area 643, an IP address setting button 644, and an installation location setting button 645. Checkboxes are added at the beginning of the setting items, and the user can select setting information to be applied to a device. The IP address setting button 644 is a setting button for setting an "IP address." When the checkbox at the beginning of the IP address setting button 644 is selected, the setting button 644 can be pressed. When the IP address setting button 644 is pressed, an individual edit screen 660 (FIG. 7B) is displayed. The installation location setting button 645 is a setting button for setting an "installation location." The operation of the installation location setting button 645 is the same as that of the IP address setting button 644.

When an OK button 646 is pressed, the setting information management unit 404 stores the values input to the setting items 642 to 645 in the setting information management table 520 and the individual information management table 530. Specifically, the value of the device name input area 642 is stored in an area of the column 522 of a record in which the value of the setting information ID 521 in the setting information management table 520 matches that of the setting information ID 641. This is similarly applied to the sleep transition time input area 643. When there is no matching setting information ID, a new record is added to the setting information management table 520. When a cancel button 647 is pressed, the management program 400 discards the edit results of the setting information edit screen 640 and terminates the setting information edit screen 640.

Figure 7B:
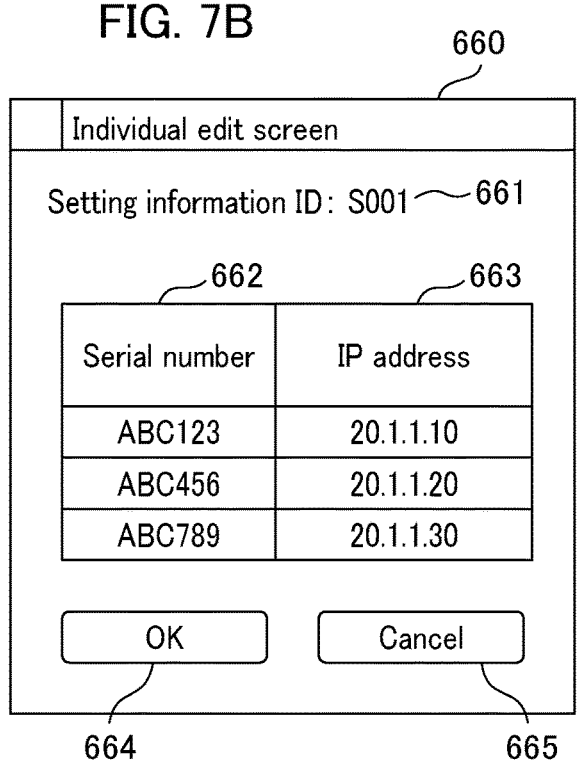

FIG. 7B shows an example of the individual edit screen 660. In a setting information ID 661, an identifier of setting information which is being edited is displayed. The value of the setting information ID 661 is the same as the value of the setting information ID 641. In a serial number 662, the value that is selected in the device selection screen 620 (FIG. 6B) and is temporarily stored in the RAM 203 or the HDD 212 is displayed. Here, another value may be used as long as the value can uniquely identify a device. In an IP address input area 663, an IP address of a device corresponding to the serial number 662 is input. It is necessary for each of the devices to have a different value set for the IP address. Therefore, in the individual edit screen 660, an IP address is input for each serial number of a device.

When an OK button 664 is pressed, the setting information management unit 404 stores the value input to the IP address input area 663 in the individual information management table 530. Specifically, the value of the IP address input area 663 is stored in an area of the column 533 of a record in which a combination of values of the setting information ID 531 and the SN 532 in the individual information management table 530 matches a combination of the setting information ID 661 and the serial number 662. When there is no matching combination of the setting information ID and the serial number, a new record is added to the individual information management table 530.

When a cancel button 665 is pressed, the management program 400 discards the edit results of the individual edit screen 660 and terminates the individual edit screen 660. Here, while IP address setting is exemplified in the individual edit screen 660 shown in FIG. 7B, the operation when the installation location setting button 645 is pressed is similarly performed. In this case, in FIG. 7B, the IP address input area 663 is replaced with an installation location input area.

In addition, in the first embodiment, when the OK button 664 of the individual edit screen 660 is pressed, the setting information management unit 404 stores the values set on the screen in the individual information management table 530. However, the present invention is not limited to this method. For example, when the OK button 664 is pressed, the setting information management unit 404 may temporarily store the value in the RAM 203 or the HDD 212. Then, when the OK button 646 of the setting information edit screen 640 (FIG. 7A) is pressed, the above temporarily stored value may be stored in the individual information management table 530.

Figure 8:
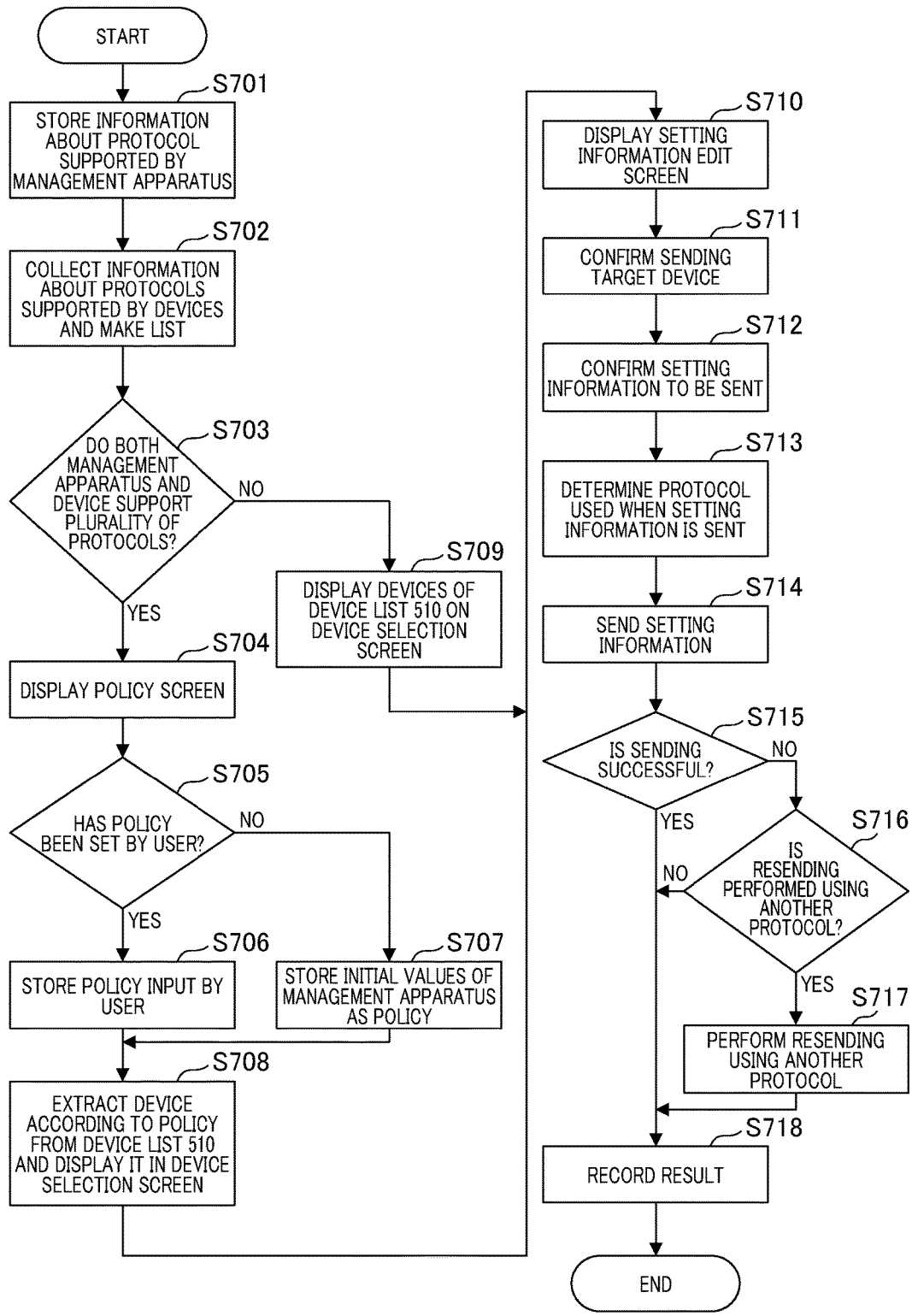
FIG. 8 is a flowchart showing the process performed when the management apparatus sends setting information.

FIG. 8 is a flowchart showing the process performed when the management apparatus 101 sends setting information.

When the user activates the management program 400 in order to send setting information to the devices 102 to 104, the process in FIG. 8 is performed. In Step S701, the device information management unit 405 stores information about a protocol supported by the management apparatus 101 itself as the value of the attribute name of "supported protocol" in the device information table 500. Here, in the process of Step S701, storing may be performed when the management program 400 is installed rather than when the management program 400 is activated.

In Step S702, the device management unit 403 collects information about protocols supported by the devices 102 to 104. Specifically, the device management unit 403 determines that a device which responds to a search request packet of SNMP transmitted through the search unit 407 is a device supporting SNMP. In addition, the device management unit 403 determines that a device which responds to a <hello> message of NETCONF transmitted through the communication unit 408 is a device supporting NETCONF.

Here, when another protocol is stored as the value of the attribute name of "supported protocol" in the device information table 500, the device management unit 403 can also determine whether the protocol is supported. Then, the device management unit 403 stores information about the device collected in Step S702 and information about the protocol supported by the device in the device list 510.

In Step S703, the control unit 402 determines whether the management apparatus 101 supports a plurality of protocols and there is a device in which a plurality of protocols are registered in the supported protocol 516 in the device list 510. When the management apparatus 101 supports a plurality of protocols and there is a device in which a plurality of protocols are registered in the supported protocol 516 in the device list 510, the process advances to Step S704, and otherwise, the process advances to Step S709.

In Step S704, the UI control unit 401 displays the policy screen 600 (FIG. 6A). In Step S705, the UI control unit 401 determines whether the policy screen 600 has been changed by the user and the OK button 604 has been pressed. When the policy screen 600 has been changed and the OK button 604 has been pressed, the process advances to Step S706. When the policy screen 600 has not been changed or the cancel button 605 has been pressed, the process advances to Step S707.

In Step S706, the UI control unit 401 transmits the values input to the policy screen 600 to the device information management unit 405. The device information management unit 405 stores the received values in the device information table 500 in the device information DB 411. In Step S707, the UI control unit 401 discards the values input to the policy screen 600. Here, when values corresponding to the attribute names in the device information table 500 are undecided, the device information management unit 405 stores values that are determined in advance as initial values in the device information table 500. For example, when the value of the attribute name of "protocol to be used" is undecided, the device information management unit 405 performs a process of storing the same value as the value of the attribute name of "supported protocol."

In Step S708, the device management unit 403 extracts devices according to attributes in the device information table 500 (FIG. 5A) from the device list 510 (FIG. 5B) and transmits them to the UI control unit 401. For example, in the device information table 500, the value of the attribute name of "protocol to be used" is "NETCONF" and "SNMP." Thus, the device management unit 403 extracts devices (devices in the first row to third row records) whose values of the supported protocol 516 in the device list 510 are "NETCONF" or "SNMP." That is, the devices extracted in Step S708 are devices whose values in the SN 511 are "ABC123," "ABC456," and "ABC789" in the device list 510. Then, the UI control unit 401 displays the extracted devices on the device selection screen 620.

On the other hand, in Step S709, the device management unit 403 extracts all devices in the device list 510 and transmits them to the UI control unit 401. Then, the UI control unit 401 displays all of the extracted devices on the device selection screen 620. The user selects a device by selecting the checkbox 621 on the device selection screen 620 displayed in Step S708 and Step S709. The device management unit 403 receives a serial number of the selected device through the UI control unit 401 and temporarily stores it in the RAM 203 or the HDD 212.

In addition Step S710, the UI control unit 401 displays the setting information edit screen 640 (FIG. 7A). In addition, when the user presses the IP address setting button 644 or the installation location setting button 645 on the setting information edit screen 640, the UI control unit 401 displays the individual edit screen 660 (FIG. 7B). The user inputs setting values to setting items on the setting information edit screen 640 and the individual edit screen 660. The setting information management unit 404 receives the input setting information through the UI control unit 401 and stores it in the setting information management table 520 and the individual information management table 530 in the setting information DB 409. In addition, the setting information management unit 404 temporarily stores setting information ID (the value of 521 or 531) of the record in which setting information is stored in the RAM 203 or the HDD 212.

In Step S711, the device management unit 403 reads the serial number that is temporarily stored in the RAM 203 or the HDD 212. In addition, device information matching the read serial number is extracted from the device list 510. When a plurality of serial numbers are stored, a serial number of a device to which sending is not performed is read. In Step S712, the setting information management unit 404 reads a setting information ID that is temporarily stored in the RAM 203 or the HDD 212 and extracts the setting information from the setting information management table 520 and the individual information management table 530. When the setting information is extracted from the individual information management table 530, the setting information ID and the serial number of the device extracted in Step S711 are used.

In Step S713, the setting information sending unit 406 determines a protocol used when setting information set in Step S710 is sent to the device extracted in Step S711. Here, as an example, a case in which setting information is sent to devices registered in the first row and third row records in the device list 510 will be described. The device registered in the first row record in the device list 510 has the value of the supported protocol 516 that is "SNMP" and "NETCONF." On the other hand, the value of the attribute name of "preferential protocol" in the device information table 500 is "NETCONF." Therefore, a protocol used for sending setting information to the device in the first row record is determined as "NETCONF."

On the other hand, the device registered in the third row record in the device list 510 has the value of the supported protocol 516 that is "SNMP." While the value of the attribute name of "preferential protocol" in the device information table 500 is "NETCONF," since the device does not support NETCONF, a protocol used for sending setting information is determined as "SNMP."

In Step S714, the setting information sending unit 406 obtains an IP address of the device extracted in Step S711 from the device list 510. Then, according to the protocol determined in Step S713, the NETCONF unit 4061 or the SNMP unit 4062 sends the setting information extracted in Step S712 to the device. In addition, the sending result is received from the device to which the setting information is sent.

For example, when the NETCONF unit 4061 sends setting information, the sending process is performed according to the following procedures.

1. The NETCONF unit 4061 receives setting information sent from the setting information management unit 404.
2. The NETCONF unit 4061 converts setting information to be transmitted into a data format that can be sent using NETCONF, that is, an XML format.

3. The NETCONF unit 4061 issues processing requests of "exchange a capacity," "lock a data store," "send setting information to a data store," "verify," "apply setting information," "release locking of a data store" to a sending target device. In addition, results for these processing requests are received. These processes are defined in NETCONF.

In addition, for example, when the SNMP unit 4062 sends setting information, the sending process is performed according to the following procedures. First, the SNMP unit 4062 receives setting information sent from the setting information management unit 404 and generates a protocol data unit (PDU). Then, the SNMP unit 4062 issues a Set request. Here, the NETCONF unit 4061 and the SNMP unit 4062 issue a sending ID when setting information is sent to a device.

In Step S715, the NETCONF unit 4061 or the SNMP unit 4062 determines whether the sending process in Step S714 is successful. Specifically, it is determined whether all of the above-described processes in Step S714 are successful. When the sending process in Step S714 is successful, the process advances to Step S718, and otherwise, the process advances to Step S716.

In Step S716, the setting information sending unit 406 determines whether resending is performed using a protocol different from the protocol used in Step S714. The determination of whether resending is performed is performed according to the sending result in Step S714. For example, resending may be performed when the sending result is an error in Step S714. In addition, resending may be performed when the sending result is an error other than a communication error. This is because, when there is a communication error, even if resending is performed using another protocol, the resending is highly likely to fail.

In addition, resending may be performed if the sending result is an error caused when setting information is sent for a setting item that does not support a protocol used for sending. For example, in the case of NETCONF, there is an error such as unknown-attribute or unknown-element. This is because support statuses of setting information in protocols may be different and resending using another protocol may be effective.

Note that, in order for the setting information sending unit 406 to determine resending in Step S716, the following conditions need to be satisfied. That is, the conditions include that a plurality of protocols be registered as the value of the attribute name of "protocol to be used" in the device information table 500 and the value of the attribute name of "resend by other protocols" be set to "ON."

Under the above-described conditions, a device in which a plurality of protocols are registered in the supported protocol 516 in the device list 510 is a device to which resending can be performed. For example, using the device information table 500 shown in FIG. 5A and the device list 510 shown in FIG. 5B, devices in the first row and second row records in the device list 510 are devices to which resending can be performed. When the setting information sending unit 406 determines that resending is performed in Step S716, the process advances to Step S717, and otherwise, the process advances to Step S718.

In Step S717, the setting information sending unit 406 resends setting information using a protocol different from the protocol used in Step S714. For example, when setting information is sent to a device in the first row record in the device list 510, if NETCONF is used in Step S714, the SNMP unit 4062 sends setting information using SNMP in Step S717. The SNMP unit 4062 receives setting information from the setting information management unit 404 and generates a PDU. Then, the SNMP unit 4062 issues a Set request.

Although not shown in the flowchart in FIG. 8, there may be a plurality of protocols that can be used when the setting information sending unit 406 performs resending. In this case, the setting information sending unit 406 repeats resending until there is no unused protocol or while switching protocols until sending is successful.

In Step S718, the NETCONF unit 4061 or the SNMP unit 4062 records the sending result in Step S714 or Step S717 in association with the sending ID issued in Step S714 in the result table 540. Note that, in the first embodiment, the sending ID 541, the sending date and time 542, the SN 543, the result 544, and the protocol used 545 are stored in the result table 540, but the present invention is not limited thereto, and for example, a setting information ID may be recorded. In Step S711, when a plurality of serial numbers are stored in the RAM 203 or the HDD 212, the processes of Step S711 to Step S718 are repeated as many times as the number of serial numbers.

(Second Embodiment)

Next, a second embodiment of the present invention will be described. In general, sending setting information to a device is repeated at regular intervals. For example, network settings may be changed at regular intervals in order to improve security and various settings may be changed according to device rearrangement. In this case, when the sending process of setting information described in the first embodiment is performed, sending setting information may fail every time for some devices.

Specifically, after setting information is sent using a preferential protocol in Step S714 in FIG. 8 in the first embodiment, the sending process may be performed again for a device to which resending is performed using a different protocol in Step S717. In the second embodiment, a method in which, even if setting information is repeatedly sent to a device to which setting information has been resent using the different protocol, it is possible to send setting information without causing an error will be described. The following description will focus on parts different from those in the first embodiment.

Figure 9:
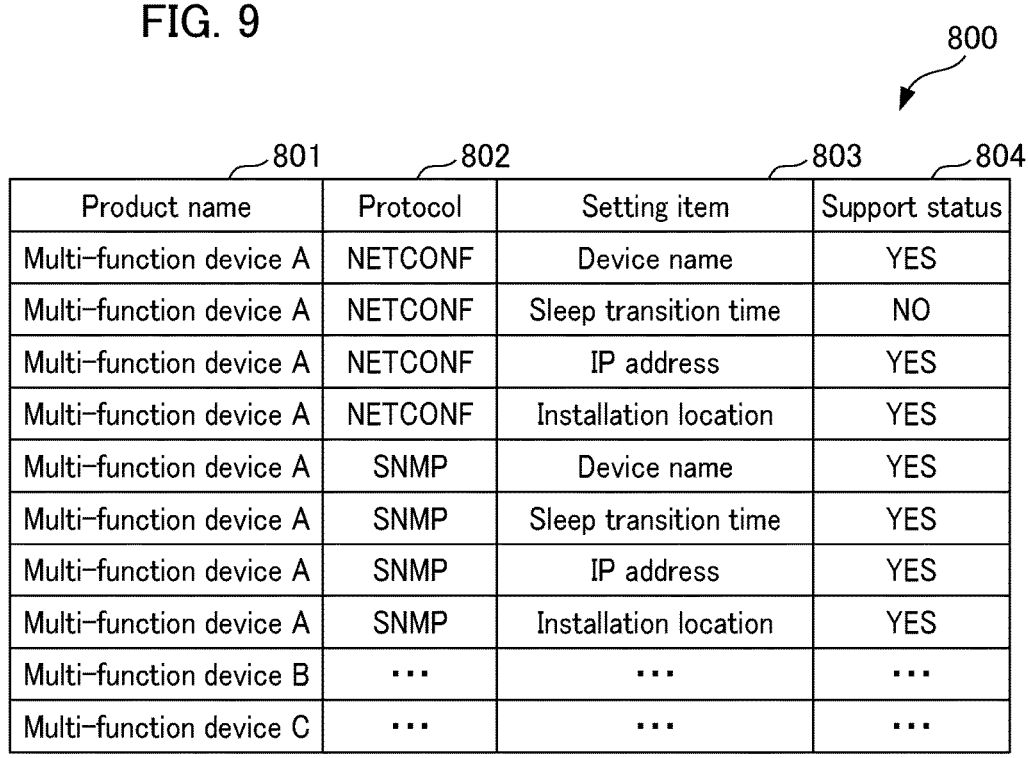
FIG. 9 is a diagram showing an example of a device type support table managed by the management apparatus.

FIG. 9 is an example of a device type support table 800 in the second embodiment.

The configuration of the table shown in FIG. 9 is only an example, and the present invention is not limited thereto, and the table may have a different configuration. The device type support table 800 includes columns 801 to 804. A product name of a device is stored in the column 801. The same value as the product name of the device stored in the column 514 in the device list 510 (FIG. 5B) is stored in the column 801.

A name of a protocol in which a setting item of the column 803 and a support status of the column 804 are confirmed in a device having a product name of the column 801 is stored in the column 802. A name of the setting item included in the setting information management table 520 (FIG. 5C) and the individual information management table 530 (FIG. 5D) is stored in the column 803. Information indicating whether a setting item of the column 803 is supported in a device corresponding to the product name of the column 801 and the protocol of the column 802 is stored in the column 804.

In the second embodiment, when the setting item is supported, "YES" is stored, and otherwise, "NO" is stored. Further, when it is unclear whether the setting item is supported, the column is left blank. Note that the present invention is not limited thereto, and any value may be stored.

In addition, while a support status of the setting item is managed for each product name in the second embodiment, a support status of the setting item may be managed for each combination of a product name and a firmware version of a device. In this case, a column for storing a firmware version of a device maybe added to the device list 510 and the device type support table 800, and information about the firmware version may be obtained from the device.

Figure 10:
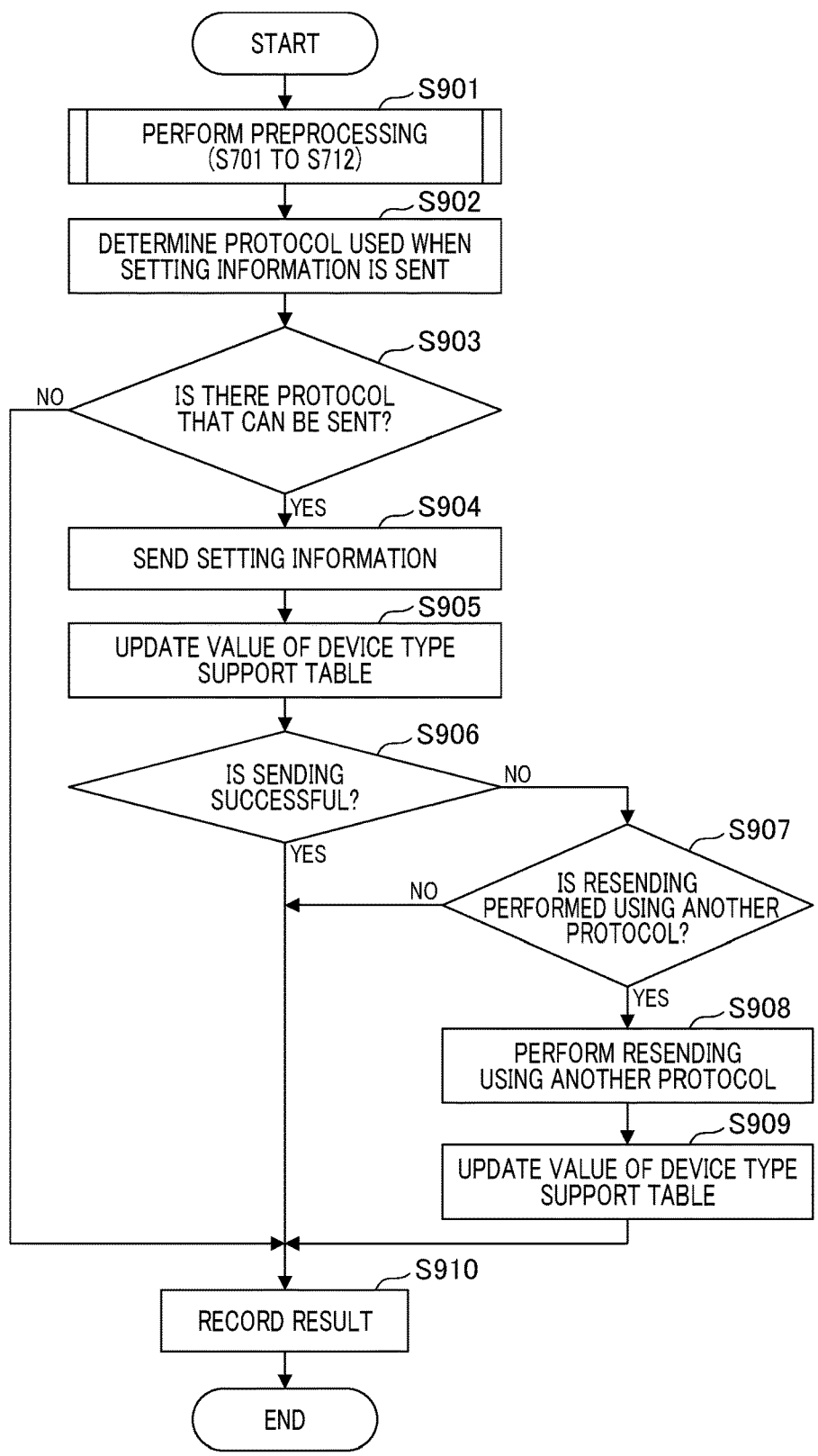
FIG. 10 is a flowchart showing the process performed when the management apparatus sends setting information.

FIG. 10 is a flowchart for describing the process performed when the management apparatus 101 sends setting information in the second embodiment.

When the user activates the management program 400 in order to send setting information to the devices 102 to 104, the process shown in FIG. 10 is performed. In Step S901, processing modules of the management program 400 perform the processes of Step S701 to Step S712 shown in FIG. 8 in the first embodiment as preprocessing.

In Step S902, the setting information sending unit 406 determines a protocol used when setting information is sent as in Step S713 (FIG. 8). In the second embodiment, the device type support table 800 (FIG. 9) is referred to in addition to the device information table 500 (FIG. 5A), and the device list 510 (FIG. 5B). Specifically, the setting information sending unit 406 performs the following procedures. That is, a record in which a combination of the product name 514 of the sending target device determined in Step S901 and the protocol determined in Step S902 matches a combination of the column 801 and the column 802 in the device type support table 800 is extracted. Then, the values of the column 803 and the column 804 in the matching record are extracted.

For example, when the sending target device is a "multifunction device A" and the protocol is "NETCONF," the setting information sending unit 406 extracts the first row to fourth row records in the device type support table 800. Then, the setting information sending unit 406 confirms support statuses of the setting items in the setting information determined in Step S901 with reference to the values of the column 803 and the column 804. In this case, when a setting item whose support status is "NO" is included in the setting information determined in Step S901, even if the management apparatus 101 sends setting information to a sending target device using the protocol, the sending result is always an error.

Therefore, the setting information sending unit 406 repeats the above-described procedures until a protocol in which the support status of the setting item in setting information is not "NO" is found. Alternatively, the setting information sending unit 406 repeats the above-described procedures until it is confirmed whether a setting item whose support status is "NO" is included for all supported protocols of the sending target device.

In Step S903, the setting information sending unit 406 determines whether there is a protocol that can be sent. When there is a protocol that can be sent, the process advances to Step S904, and otherwise, the process advances to Step S910. The process of Step S904 is the same as the process of Step S714 shown in FIG. 8. In Step S905, the NETCONF unit 4061 or the SNMP unit 4062 updates values in the device type support table 800.

Specifically, the values of the column 803 and the column 804 that match a combination of the value of the product name 514 in the sending target device and the value of the protocol used during sending are updated. Here, it is assumed that a support status of each setting item is included in the sending result received by the NETCONF unit 4061 or the SNMP unit 4062 from the device. When a support status of each setting item is not included in the sending result received from the device, and only a result of the collective sent setting information is received, the value of the device type support table 800 is updated only when sending setting information in Step S904 is successful. Then, when sending has failed, the value of the device type support table 800 is not updated.

The processes of Step S906 to Step S908 are the same as the processes of Step S715 to Step S717 shown in FIG. 8. In addition, the process of Step S909 is the same as the process of Step S905, and the process of Step S910 is the same as the process of Step S718 shown in FIG. 8. Therefore, these processes will not be described.

Here, when the device type support table 800 in the second embodiment is used, the management apparatus 101 can flexibly manage the following cases. For example, an error may occur even if setting information using NETCONF is sent to a device supporting NETCONF. That is, in a device having a setting item for which NETCONF is not supported, when setting information is sent to the setting item, the sending result is an error.

On the other hand, in the device type support table 800, support statuses of protocols are stored for each product name and setting item of a device. Therefore, it is possible to change a protocol to be sent according to whether setting information to be sent is for a supported setting item in a device having the same product name as the sending target device.

(Third Embodiment)

Next, a third embodiment of the present invention will be described. When the management apparatus 101 sends setting information to a plurality of devices, it is necessary to apply setting information to all of the devices simultaneously for some types of the setting information. For example, a case in which IP addresses are exchanged is conceivable.

As long as a device supports a protocol having the concept of transaction such as NETCONF, the process of applying setting information simultaneously described above is possible. However, it is not possible to perform the process of applying setting information simultaneously in a device that supports only a protocol that does not have the concept of transaction such as SNMP. In the third embodiment, a method in which the process of applying setting information simultaneously is implemented in a pseudo manner in an environment in which devices supporting a protocol having the concept of transaction and other devices are mixed will be described. The following description will focus on parts different from those in the first embodiment.

Figure 11:
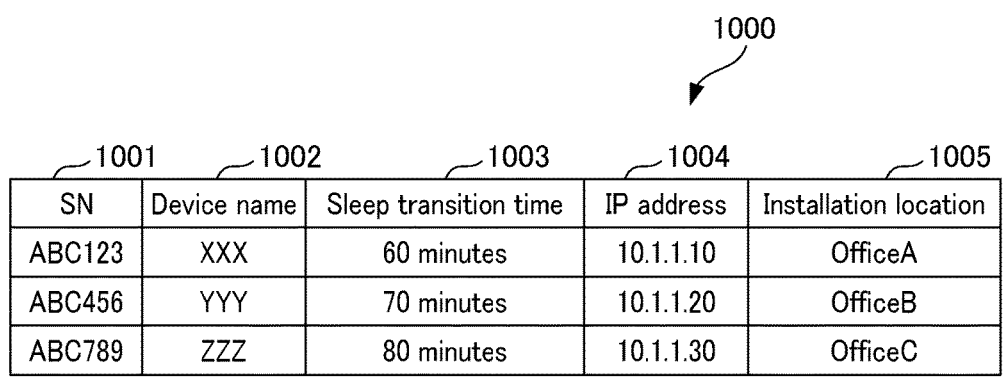
FIG. 11 is a diagram showing an example of a backup table managed by the management apparatus.

FIG. 11 is an example of a backup table 1000 in the third embodiment.

In the backup table 1000, current setting information of a device obtained by the management apparatus 101 before setting information is sent to the device is stored. Here, the configuration of the table shown in FIG. 11 is only an example, and the present invention is not limited thereto, and different configurations may be used. The backup table 1000 includes columns 1001 to 1005.

A serial number of a device that has obtained setting information of the column 1002 and those subsequent thereto is stored in the column 1001. "Device name," "sleep transition time," "IP address," and "installation location" are stored as setting information of a device in the columns 1002 to 1005. Here, the "device name," "sleep transition time," "IP address," and "installation location" are exemplary information items stored as setting information, but the present invention is not limited thereto, and other information items may be stored.

FIG. 12 shows examples of UI screens that are provided by the management apparatus 101 using the UI control unit 401 of the management program 400.

Figure 12A:
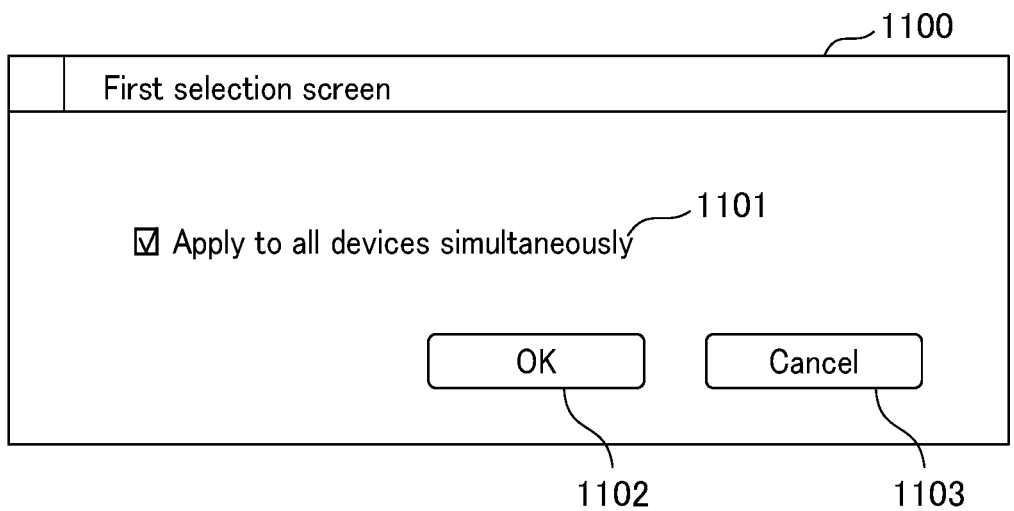
FIG. 12A and FIG. 12B are diagrams showing examples of UI screens provided by the management apparatus.

FIG. 12(A) is an example of a first selection screen 1100. In the flowchart to be described below, the UI control unit 401 displays the first selection screen 1100 when there are a plurality of devices to which setting information is sent and a protocol used for sending is only NETCONF.

In a selection area 1101, it is selected whether setting information to be sent is applied to all devices simultaneously. When an OK button 1102 is pressed, the setting information sending unit 406 temporarily stores the selection state of the selection area 1101 in the RAM 203 or the HDD 212. When a cancel button 1103 is pressed, the management program 400 discards the selection result of the first selection screen 1100 and terminates the first selection screen 1100. In this case, the setting information sending unit 406 assumes a non-selection state of the selection area 1101 and temporarily stores the state in the RAM 203 or the HDD 212.

Figure 12B:
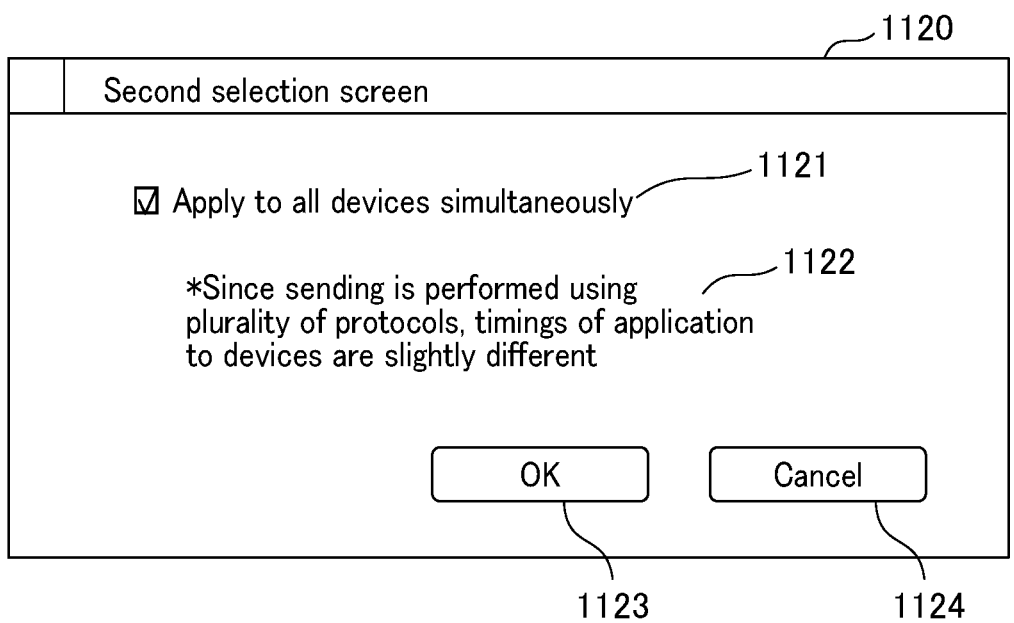

FIG. 12(B) is an example of a second selection screen 1120. In the flowchart to be described below, the UI control unit 401 displays the second selection screen 1120 when there are a plurality of devices to which setting information is sent and protocols used for sending include both NETCONF and SNMP. A selection area 1121 is the same as the selection area 1101 of the first selection screen 1100. Information indicating that timings at which sending to a plurality of sending target devices is performed do not match is displayed in a comment 1122 as a note when setting information is applied simultaneously.

When an OK button 1123 is pressed, the setting information sending unit 406 temporarily stores the selection state of the selection area 1121 together with a sending ID in the RAM 203 or the HDD 212. When a cancel button 1124 is pressed, the management program 400 discards the selection result of the second selection screen 1120 and terminates the second selection screen 1120. In this case, the setting information sending unit 406 assumes a non-selection state of the selection area 1121 and temporarily stores the state in the RAM 203 or the HDD 212 together with the sending ID.

Figure 14:
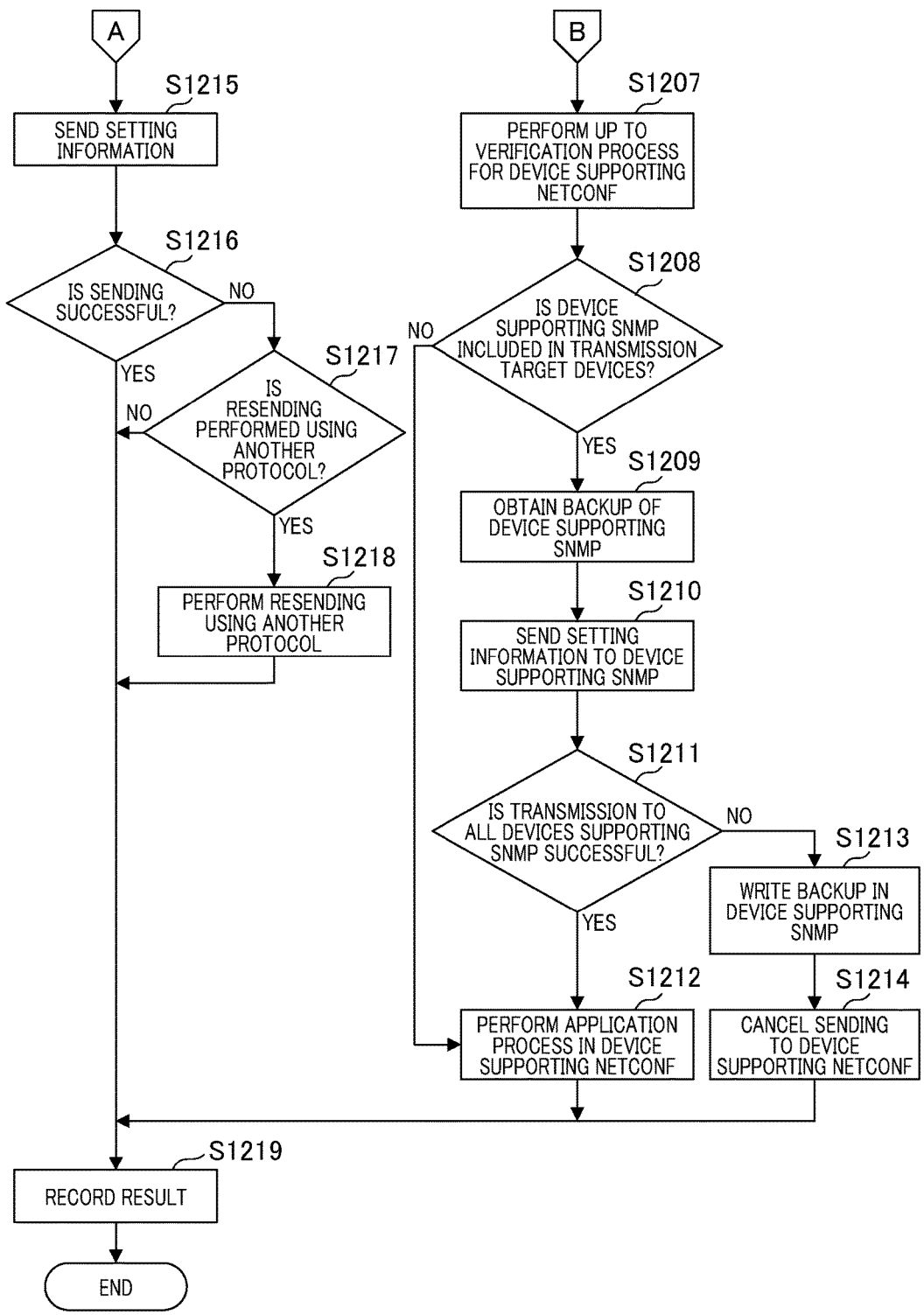
FIG. 14 is a flowchart showing the process performed when the management apparatus sends setting information.

FIG. 13 and FIG. 14 are flowcharts for describing the process performed when the management apparatus 101 sends setting information in the third embodiment.

When the user activates the management program 400 in order to send setting information to the devices 102 to 104, the process shown in FIGS. 13 and 14 is performed. In Step S1201, processing modules of the management program 400 perform the processes of Step S701 to Step S713 shown in FIG. 8 in the first embodiment as preprocessing.

In Step S1202, the setting information sending unit 406 determines whether the sending target devices determined in Step S1201 are only devices which use NETCONF (a device supporting NETCONF). When it is determined that the sending target devices determined in Step S1201 are only devices supporting NETCONF, the process advances to Step S1203, and otherwise, the process advances to Step S1204. In Step S1203, the UI control unit 401 displays the first selection screen 1100 (FIG. 12(A)) and receives the user's input to the selection area 1101. Then, the UI control unit 401 transmits the result input by the user to the setting information sending unit 406.

In Step S1204, the setting information sending unit 406 determines whether the sending target devices determined in Step S1201 are only devices which use SNMP (a device supporting SNMP). When it is determined that the sending target devices determined in Step S1201 are only devices supporting SNMP, the process advances to Step S1215 (FIG. 14), and otherwise, the process advances to Step S1205.

In Step S1205, the UI control unit 401 displays the second selection screen 1120 (FIG. 12(B)) and receives the user's input to the selection area 1121. Then, the UI control unit 401 transmits the result input by the user to the setting information sending unit 406. In Step S1206, the setting information sending unit 406 determines whether the user has selected simultaneous application of setting information in Step S1203 or Step S1205. When the user has selected simultaneous application of setting information, the process advances to Step S1207 in FIG. 14, and otherwise, the process advances to Step S1215 in FIG. 14.

In Step S1207, the NETCONF unit 4061 performs "exchange a capacity," "lock a data store," "send setting information to a data store," and "verify" for a device supporting NETCONF in the same method as in Step S714 in FIG. 8. In Step S1208, the setting information sending unit 406 determines whether a device supporting SNMP is included in the sending target devices. When a device supporting SNMP is included, the process advances to Step S1209, and otherwise, the process advances to Step S1212.

In Step S1209, the SNMP unit 4062 obtains current setting information of the device supporting SNMP as a backup. Specifically, the SNMP unit 4062 issues a Get request and a Get Next request of SNMP. A setting item to be obtained is a setting item that is a sending target of the setting information in Step S1201. Then, the setting information management unit 404 stores the obtained current setting information in the backup table 1000.

In Step S1210, the SNMP unit 4062 sends the setting information determined in Step S1201 to the device supporting SNMP and receives the sending result from the device supporting SNMP. The process of sending setting information to the device supporting SNMP is the same as the process of Step S714. In Step S1211, the SNMP unit 4062 determines whether setting information has been successfully sent to all devices supporting SNMP. When setting information has been successfully sent to all devices supporting SNMP, the process advances to Step S1212. When sending setting information to a device supporting SNMP is not successful, the process advances to Step S1213.

In Step S1212, the NETCONF unit 4061 issues processing requests of "apply setting information," and "release locking of a data store" to all devices supporting NETCONF. In Step S1213, the SNMP unit 4062 writes setting information of all devices supporting SNMP in the setting information obtained as a backup in Step S1209. Specifically, the setting information management unit 404 extracts setting information of each device with reference to the value (SN) of the column 1001 in the backup table 1000. Then, the SNMP unit 4062 receives setting information from the setting information management unit 404 and generates a PDU. Furthermore, the SNMP unit 4062 issues a Set request.

In Step S1214, the NETCONF unit 4061 cancels the process up to "verify" performed in Step S1207 for all devices supporting NETCONF. Specifically, the NETCONF unit 4061 issues a cancel command (cancel-commit command) of NETCONF to all devices supporting NETCONF. The processes of Step S1215 to Step S1219 are the same as the processes of Step S714 to Step S718 shown in FIG. 8, and descriptions thereof will not be described.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-172764, filed Sep. 5, 2016, which is hereby incorporated by reference wherein in its entirety.

What is claimed is:

1. A management apparatus comprising:
    a memory storing instructions related to operations for management of a plurality of network devices using a first protocol that is SNMP (Simple Network Management Protocol) and a second protocol different from the first protocol; and
    a processor executing the instructions causing the management apparatus to:
    manage whether or not each of the network device supports the second protocol and the first protocol;
    display a screen in which a setting for sending the setting information to a plurality of sending target network devices simultaneously can be selected if a network device that supports the second protocol and a network device that does not support the second protocol are included in the plurality of sending target network devices;
    display information indicating that the timings at which the sending to the network devices do not match if the setting for sending the setting information to the plurality of sending target network devices simultaneously is selected:
    send the setting information according to specifications of the second protocol to the sending target network device that supports the second protocol; and
    send the setting information according to specifications of the first protocol to the sending target network device that does not support the second protocol, wherein the second protocol defines a request for controlling a setting operation using a plurality of data stores secured in the network device, in which setting information is managed in a data format different from that of the first protocol.

2. The management apparatus according to claim 1, wherein the second protocol is NETCONF.

3. The management apparatus according to claim 1, wherein the plurality of data stores include at least either a Candidate data store or a Startup data store in addition to a Running data store.

4. The management apparatus according to claim 1, wherein the instructions further cause the management apparatus to:
    perform setting in which the setting information is resent according to specifications of another protocol different from the second protocol to a network device corresponding to an error if the result of sending the setting information according to the specifications of the second protocol is the error, and
    perform resending the setting information according to specifications of the another protocol if the result of sending the setting information is an error.

5. The management apparatus according to claim 4, wherein, in the resending of the setting information, setting information for a setting item that does not support the second protocol is sent according to specifications of the another protocol.

6. The management apparatus according to claim 4, wherein, if the result of sending the setting information according to the specifications of the second protocol is a communication error, the resending of the setting information is not performed.

7. The management apparatus according to claim 1, wherein the instructions further cause the management apparatus to:
    obtain current setting information of the network device that does not support the second protocol as a backup if the setting for sending the setting information to the plurality of sending target network devices simultaneously is selected; and
    when the setting information is sent to the plurality of sending target network devices according to the specifications of the second protocol and the result of sending the setting information to any one of the network devices is an error, (i) send the setting information obtained as the backup to the network device that does not support the second protocol and (ii) issue a cancel-commit command to all network devices that support the second protocol.

8. A method for a management apparatus for management of a plurality of network devices using a first protocol that is SNMP (Simple Network Management Protocol) and a second protocol different from the first protocol, the method comprising:
    managing whether or not each of the network device supports the second protocol and the first protocol;
    displaying a screen in which a setting for sending the setting information to a plurality of sending target network devices simultaneously can be selected if a network device that supports the second protocol and a network device that does not support the second protocol are included in the plurality of sending target network devices;
    displaying information indicating that the timings at which the sending to the network devices do not match if the setting for sending the setting information to the plurality of sending target network devices simultaneously is selected;

sending the setting information according to specifications of the second protocol to the sending target network device that supports the second protocol; and sending the setting information according to specifications of the first protocol to the sending target network device that does not support the second protocol, wherein the second protocol defines a request for controlling a setting operation using a plurality of data stores secured in the network device, in which setting information is managed in a data format different from that of the first protocol.

9. A non-transitory storage medium on which is stored a computer program for making a computer execute a method for a management apparatus for management of a plurality of network devices using a first protocol that is SNMP (Simple Network Management Protocol) and a second protocol different from the first protocol, the method comprising:

managing whether or not each of the network device supports the second protocol and the first protocol;

displaying a screen in which a setting for sending the setting information to a plurality of sending target network devices simultaneously can be selected if a network device that supports the second protocol and a network device that does not support the second protocol are included in the plurality of sending target network devices;

displaying information indicating that the timings at which the sending to the network devices do not match if the setting for sending the setting information to the plurality of sending target network devices simultaneously is selected;

sending the setting information according to specifications of the second protocol to the sending target network device that supports the second protocol; and sending the setting information according to specifications of the first protocol to the sending target network device that does not support the second protocol, wherein the second protocol defines a request for controlling a setting operation using a plurality of data stores secured in the network device, in which setting information is managed in a data format different from that of the first protocol.

10. The management apparatus according to claim 1, wherein the instructions further cause the management apparatus to:

perform setting in which the second protocol is used preferentially to the first protocol when sending setting information to a network device; and send, according to the setting by which the second protocol is used preferentially to the first protocol, the setting information according to specifications of the second protocol to the network device if the sending target network device supports the second protocol.

* * * * *